US008639223B1

(12) United States Patent
Hu

(10) Patent No.: US 8,639,223 B1
(45) Date of Patent: Jan. 28, 2014

(54) INTEREST-BASED INTELLIGENT MOBILE MESSAGING SERVICE ALERTS SUBSCRIPTION MODEL

(75) Inventor: Dongliang Hu, Pleasanton, CA (US)

(73) Assignee: Cellco Partnership, Basking Ridge, NJ (US)

(*) Notice: Subject to any disclaimer, the term of this patent is extended or adjusted under 35 U.S.C. 154(b) by 123 days.

(21) Appl. No.: 13/172,346

(22) Filed: Jun. 29, 2011

(51) Int. Cl.
*H04M 3/42* (2006.01)

(52) U.S. Cl.
USPC .......... 455/412.1; 455/414; 455/567; 705/14; 705/45; 705/14.69

(58) Field of Classification Search
USPC .......... 455/412.1, 414, 567; 705/14.45, 14.69
See application file for complete search history.

(56) References Cited

U.S. PATENT DOCUMENTS

2009/0018913 A1* 1/2009 Sarukkai et al. ................ 705/14
2009/0234862 A9* 9/2009 Begeja et al. ................. 707/100
2009/0249321 A1* 10/2009 Mandyam et al. ............ 717/171
2010/0279667 A1* 11/2010 Wehrs et al. ................ 455/414.1
2011/0143720 A1* 6/2011 Sanjeev ...................... 455/412.2
2011/0178868 A1* 7/2011 Garg et al. ................. 705/14.45

OTHER PUBLICATIONS

ESPN—Alerts FAQ, <http://proxy.espn.go.com/mobile/alerts/faq>, accessed Nov. 29, 2010.
Verizon Alerts, <https://alerts.vzw.com/guest/general/Overview.do>, accessed Nov. 29, 2010.
Verizon Alerts—Text and Picture, accessed Nov. 29, 2010.

* cited by examiner

*Primary Examiner* — Ajit Patel
*Assistant Examiner* — Julio Perez

(57) ABSTRACT

A unified alerts message service delivers an alerts message, including content of interest to a user, to a mobile station of the user. Interest information of the user, which defines user's preferences or interests, is inputted by the user to an interface provided by a platform for providing the alerts message service. The platform receives various alerts contents from a number of content providers, and performs a logical matching to find alerts contents that logically match the user's interest information among the received alerts contents. The alerts contents found from the logical matching are sent in one or more mobile messaging service messages including combined alerts contents are sent to a mobile station of the user via a mobile network.

16 Claims, 5 Drawing Sheets

INTEREST-BASED INTELLIGENT MOBILE MESSAGING SERVICE ALERTS SUBSCRIPTION MODEL

TECHNICAL FIELD

The present subject matter relates to techniques and equipment to allow a user to subscribe to an alerts message service through one provider, e.g. the network service provider, to obtain alerts on various topics of interest from a variety of different content providers.

BACKGROUND

In recent years, mobile communication services have expanded and increased in popularity, around the world. Many advanced networks offer wireless mobile communication service for voice calls, mobile messaging services (e.g. text and/or multimedia) and data communications. The mobile messaging services have been used for various purposes, e.g. from exchanging messages between mobile station users, to delivering alerts to mobile station users by content providers.

An alerts service delivers a short messaging service (SMS) message or a multimedia messaging service (MMS) message to a mobile station to notify a mobile station user of an event or information in which the mobile station user is interested. To subscribe to the alerts delivery service, the mobile station user has to visit a platform provided by a content provider, e.g. a website for a sports service such as ESPN, and to subscribe to the service via the platform provided by the content provider.

The content provider platform provides the mobile station user with categories and types of alerts made available by the content provider. The available categories and types of alerts are those that have been selected and defined by the content provider, and the mobile station user has to pick from among only the categories and types offered by the platform of the particular content provider. This unilateral alerts subscription cannot always satisfy the mobile station user's demands for receiving alerts on various topics and information of most interest to the user. A provider may not offer alerts with regard to all the topics of interest to a particular user, which prevents the user from obtaining desired alerts from a particular provider. Alternatively, the categories/types may be too broad for a user's particular narrow interest, which results in the user receiving many undesired alerts on topics of little or no interest to the user.

If one content provider does not offer alerts with regard to all the topics of interest to a particular user, and as a result, the mobile station user wants to receive alerts provided by multiple content providers, the mobile station user has to visit platforms of a number content providers and subscribe to alerts services of the various different content providers respectively. This traditional alerts delivery service requires the mobile station users to establish and manage multiple subscriptions to respective content providers, a cumbersome process. For example, if the mobile station user wants to receive alerts service messages from "ESPN," "CNN," and "ABC," the mobile station user has to visit the subscription sites for "ESPN," "CNN," and "ABC," individually, and repeatedly subscribe to and input various preferences and/or similar personal information to select categories and types of alerts for alerts services of "ESPN," "CNN," and "ABC," respectively.

Hence, a need exists for an intelligent alerts messaging service to provide a mobile station user with alerts of his or her interest from various resources. Another need exists for an intelligent messaging alerts delivery service to simplify a subscription process to register for receiving alerts from a plurality of content providers.

SUMMARY

The teachings herein alleviate one or more of the above noted problems with a service for delivery alerts messages with contents from respective content providers to a user's mobile station.

An aspect of the disclosure is a method for delivering unified alerts service messages with alerts contents from content providers to a mobile station of a user. User's interest keywords are received and stored. The alerts contents are received from the content providers. The user's interest keywords are expanded into set of equivalent keywords, and the set of equivalent keywords are matched with the received alerts contents to identify alerts contents from the content providers. One or more mobile messaging service messages including the identified alerts contents are sent from a unified alerts service platform to a terminal device of the user via a network.

In a disclosed example, the user's interest keywords as well as message delivery related preferences, such as a limit of number of alerts, a preferred type of message and preferred receipt periods for alerts are inputted by the user via a web-based interface or a mobile phone-based interface. For example, the delivery service may stop sending more mobile messaging service messages to the terminal when number of the identified alert contents reaches the limit of number of alerts and/or when outside the user specified preferred receipt periods.

In a specific example discussed in the detailed description, the logical matching step combines the expanded set of keywords with logical operators, and determines the identified alerts contents by matching the combined expanded set of keywords with the received alerts contents.

Another aspect of the disclosure relates to a method for providing unified alerts service messages with alerts contents from content providers, where the user's subscription stored in a database includes a first number of ordinary subscriptions and a second number of interest-based subscriptions. The ordinary subscriptions define user's preferred categories, and the interest-based subscriptions are defined by user's interest keywords. The alert contents are received from the content providers, and alert contents are identified from the content providers according to the retrieved user's subscriptions. One or more mobile messaging service messages including the identified alerts contents are sent from a unified alerts service platform to a terminal device of the user via a network.

In an example of this later methodology, assuming that the first number is greater than zero, category identifiers of the first number of ordinary subscriptions are identified, and the identified category identifiers are matched with categories of the received alert contents. In a related example, assuming that the second number is greater than zero, the user's interest keywords are expanded into a set of equivalent keywords. The equivalent keywords are logically matched with the received alerts contents to identify alerts contents from the plurality of the content providers.

Other examples discussed in the detailed description below relate to computer systems configured to implement one or more of the exemplary methodologies outlined above.

Other disclosed concepts relate to unique software for implementing aspects of the unified alerts messaging service. A software product, in accord with this type of concept, includes at least one machine-readable medium and information carried by the medium. The information carried by the medium may be executable program code, one or more databases and/or information regarding the unified alerts messaging service.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various teachings disclosed herein relate to a unified alerts message delivery service. The service is unified in that it obtains contents from a number of providers, and based on a user's subscription with the unified service, selects contents from multiple providers meeting the user's interests and sends message(s) with the selected contents to a user terminal device. For example, the user inputs keywords or the like of his or her interest via an interface for communication with a server or other implementation of a unified platform for delivering the alerts service message(s). The platform receives contents for alerts from various content providers, and finds contents corresponding to the user's interest by a logical matching process. In an example, the platform expands keywords into filtering keywords by logically combining keywords equivalent to the user's inputted keywords. A logical matching process finds alerts contents that match with the filtering keywords. The platform combines identified contents from multiple providers selected by the matching process and sends at least one message including the contents, for example, to the user's mobile station. In addition to the interest-based subscriber using the keywords, the service may also offer ordinary subscriptions, e.g. based on category identifiers (IDs). Selected contents from different providers may be combined and sent in one alerts message to the user terminal, or the selected contents may be sent in a number of combined messages or in individual messages carrying individual items of selected contents.

Figure 1:
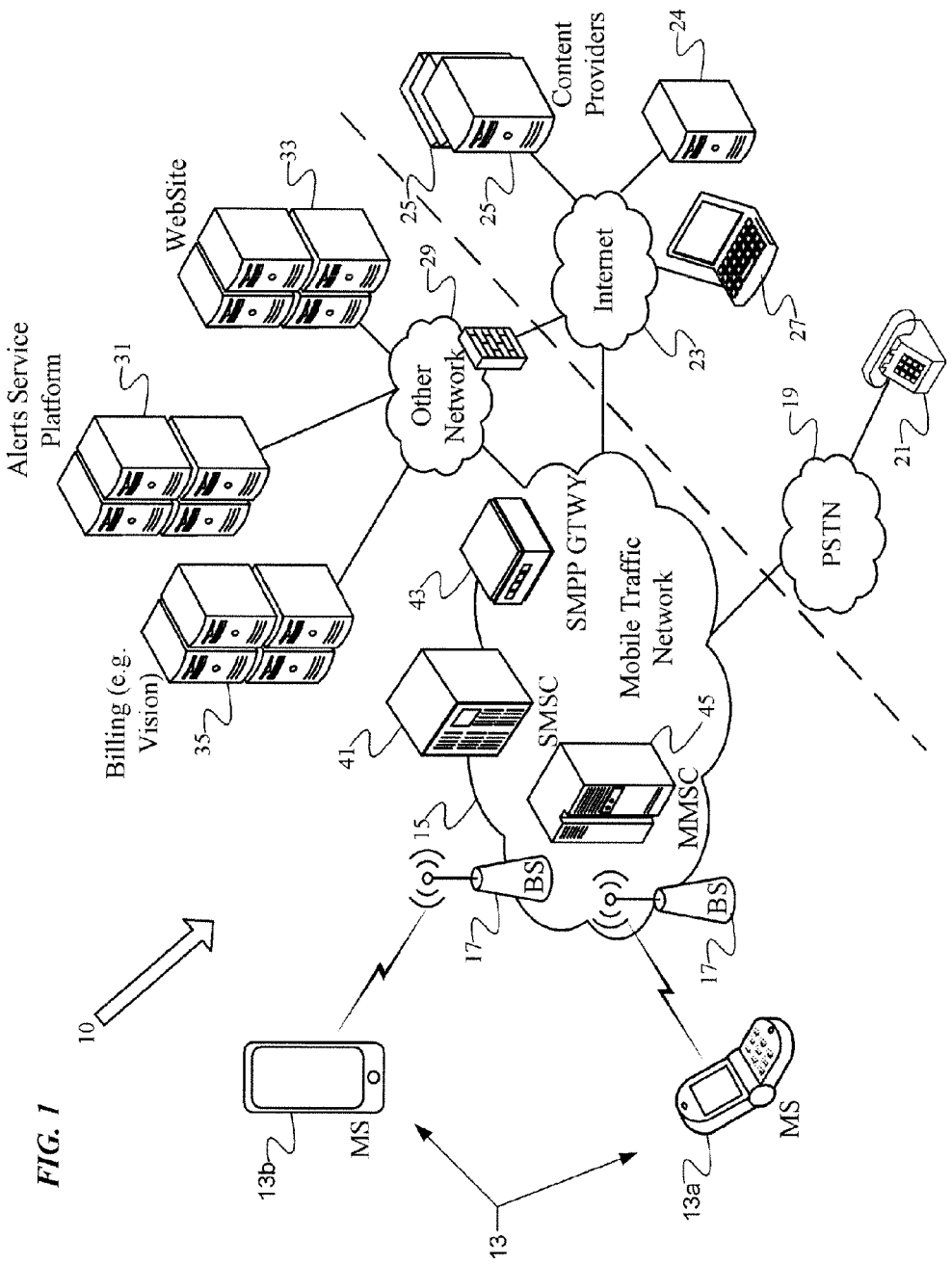
FIG. 1 is a high-level functional block diagram of an example of a system of networks/devices offering a variety of mobile communication services, including communications for providing alerts on various topics from a variety of different content providers.

Reference now is made in detail to the examples illustrated in the accompanying drawings and discussed below. FIG. 1 is a block diagram illustrating a system 10 offering a variety of mobile communication services, including communications for providing alerts on various topics using contents obtained from a variety of different content providers. The example shows simply two mobile stations (MSs) 13a and 13b as well as a mobile communication network 15. The stations 13a and 13b are examples of mobile stations 13 that may be used for obtaining alerts on various topics from content providers. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station 13 compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 are capable of voice telephone communications through the network 15, and SMS/MMS communications for receiving alerts messages. The exemplary devices 13a and 13b are capable of data communications through the particular type of network 15, and the users thereof typically will have subscribed to data service through the network.

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 24 connected to the Internet 23; and the data services for the mobile stations 13 via the Internet 23 may be with devices like those shown at 24 and 27 as well as with a variety of other types of devices or systems capable of data communications through various interconnected networks. The mobile stations 13a and 13b of users of the alerts delivery service also can receive and execute applications written in various programming languages, as discussed in more detail below.

Mobile stations 13 can take the form of portable handsets, smart-phones, tablets or personal digital assistants, although they may be implemented in other form factors. Program applications, including an application to assist in the alerts delivery service and/or any an application purchased via the on-line alerts delivery service can be configured to execute on many different types of mobile stations 13. For example, a mobile station application can be written to execute on a binary runtime environment for mobile (BREW-based) mobile station, a Windows Mobile based mobile station, Android, iPhone, Java Mobile, or RIM based mobile station such as a BlackBerry or the like. Some of these types of devices can employ a multi-tasking operating system.

The communication network system 10 can be implemented by a number of interconnected networks. Hence, the mobile network 15 may include a number of radio access networks (RANs), as well as regional ground networks interconnecting a number of RANs and a wide area network (WAN) interconnecting the regional ground networks to core network elements. A regional portion of the network 15, such as the serving mobile stations 13, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more alerts service application servers 31 and a related website server 33 for the application service of the alerts server 31 as well as a billing system or server 35.

A mobile station 13 communicates over the air with a base station 17 and through the traffic network 15 for various voice and data communications, e.g. through the Internet 23 with a server 24 and/or with an alerts service platform 31. If the mobile service carrier offers the alerts delivery service, the service may be hosted on a carrier operated alerts service platform 31, for communication via the networks 15 and 29. Alternatively, the alerts delivery service may be provided by a separate entity (alone or through agreements with the carrier), in which case, the service may be hosted on an application server such as the server 24 connected for communication via the networks 15 and 23.

In the example, the unified service is hosted on the platform 31 and the affiliated website server 33. The website server 33 provides a user interface, e.g. for user input of subscription related information. The platform 31 receives contents for alerts service messages from servers 25 of third party content providers and sends alerts messages containing selected contents to the users subscribing to the unified alerts delivery service. Each provider may operate one or more such servers 25. Each third party server 25 in the drawing could be a server platform for any of a variety of information communication services, including independent alerting services. For purpose of further discussion, we will focus on functions of servers like 25 in support of the alerts delivery service. For example, for the unified alerts service, the servers 25 supply alerts contents to the unified alerts service platform 31, via the Internet 23 and the network 29 in our example; and the platform 31 performs preference selection of contents (keyword matching for interest-based subscription and/or matching category IDs for ordinary subscriptions) and generates and transmits alerts messages with the selected contents. Billing for providing the unified alerts service is handled by a billing server 35.

The carrier operating the network provides a number of digital messaging services for its customers, such as text messaging, multimedia messaging, voice mail and visual voice mail. For these purposes, the network operator will have various network connected storage and forwarding devices. In the example, the carrier operates a short message service center (SMSC) 41 which stores SMS messages and forwards the stored SMS messages, e.g. to destination mobile stations, and a multimedia messaging service center (MMSC) 45 which stores MMS messages and forwards the MMS messages to destination mobile stations.

The system includes one or more Short Message Peer-to-Peer (SMPP) protocol gateways 43. The SMPP gateway 43 provides protocol conversions, between SMPP as used by the SMSC 41 and the protocols used on the Internet 23 or other IP network. SMPP messages ride on IP transport, e.g. between the gateway 43 and the SMSC 41.

The servers 25 of the external content providers may take the form of External Short Message Entity (ESME) servers for sending alerts messages to mobile users who subscribe to direct alerts services of those providers. An ESME server is configured to implement an application service that utilizes SMS, EMS and/or MMS type message transport through the wireless mobile communication network. Typically, the ESME server is a third party customer system outside the carrier's network(s), e.g. a system of a value added service provider (VASP). For the message transmission portion of the unified alerts message service, the alerts service platform 31 may also be configured as an ESME server, albeit one operated by the carrier that operates the mobile communication network.

Rather than communicate directly with the other elements of the carrier's wireless network, an ESME server usually sends and receives messages over an IP network or link and through a SMPP gateway connected to the IP packet portion of the carrier's wireless network. Hence, the servers 25 of the external content providers communicate via the Internet 23 to/from an SMPP gateway 43; and the ESME server operating as the alerts service platform 31 communicates via the network 29 to/from the same or similar SMPP gateway 43.

The SMSC 41 and the MMSC 45 communicate with external customer equipment, typically computers hosting ESME applications, via an IP network. The SMPP gateway 43 provides the interface for such communications. The SMPP gateway 43 communicates with the SMSC 41 and MMSC 45 via an internal IP link or network (not separately shown), and the gateway 43 communicates with the packet data network 29 and/or the public Internet 23. The gateway 43 allows the SMSC 41 and the MMSC 45 to receive and send messages in IP packet format. The SMPP gateway 43 is the entity at the edge of the mobile traffic communication network 15 that acts as an intermediary between the wireless service provider network and the external application server community. For example, the gateway server 43 converts messages in protocol(s) used by the ESME applications on the external servers, e.g. Extensible Markup Language (XML), Hypertext Mail Protocol (HTMP), etc., to and from the SMPP protocol used for SMS services through the wireless network. The SMPP messages ride on IP transport, e.g. between the gateway 43 and the SMSC 41 or the MMSC 45.

For the unified alerts service, the server equipment 25 of the external content providers also communicates with the alerts service platform 31, for example, via the networks 23 and 29 and a firewall or the like.

The enhanced alerts delivery service under consideration here may be delivered to touch screen type mobile stations as well as to non-touch type mobile stations. Hence, our simple example shows the mobile station (MS) 13*a* as a non-touch type mobile station and shows the mobile station (MS) 13*b* as a touch screen type mobile station. The mobile stations are capable of receiving and supporting various types of mobile messaging services, such as short messaging service (SMS), enhanced messaging service (EMS) and/or multimedia messaging service (MMS). The alerts may be delivered in any of the message forms supported by the network and respective users' mobile stations 13. The alerts also may be delivered in various forms using IP packet transport, e.g. as emails to a mobile station 13 or to another type of data capable terminal like the PC shown at 27.

Figure 2:
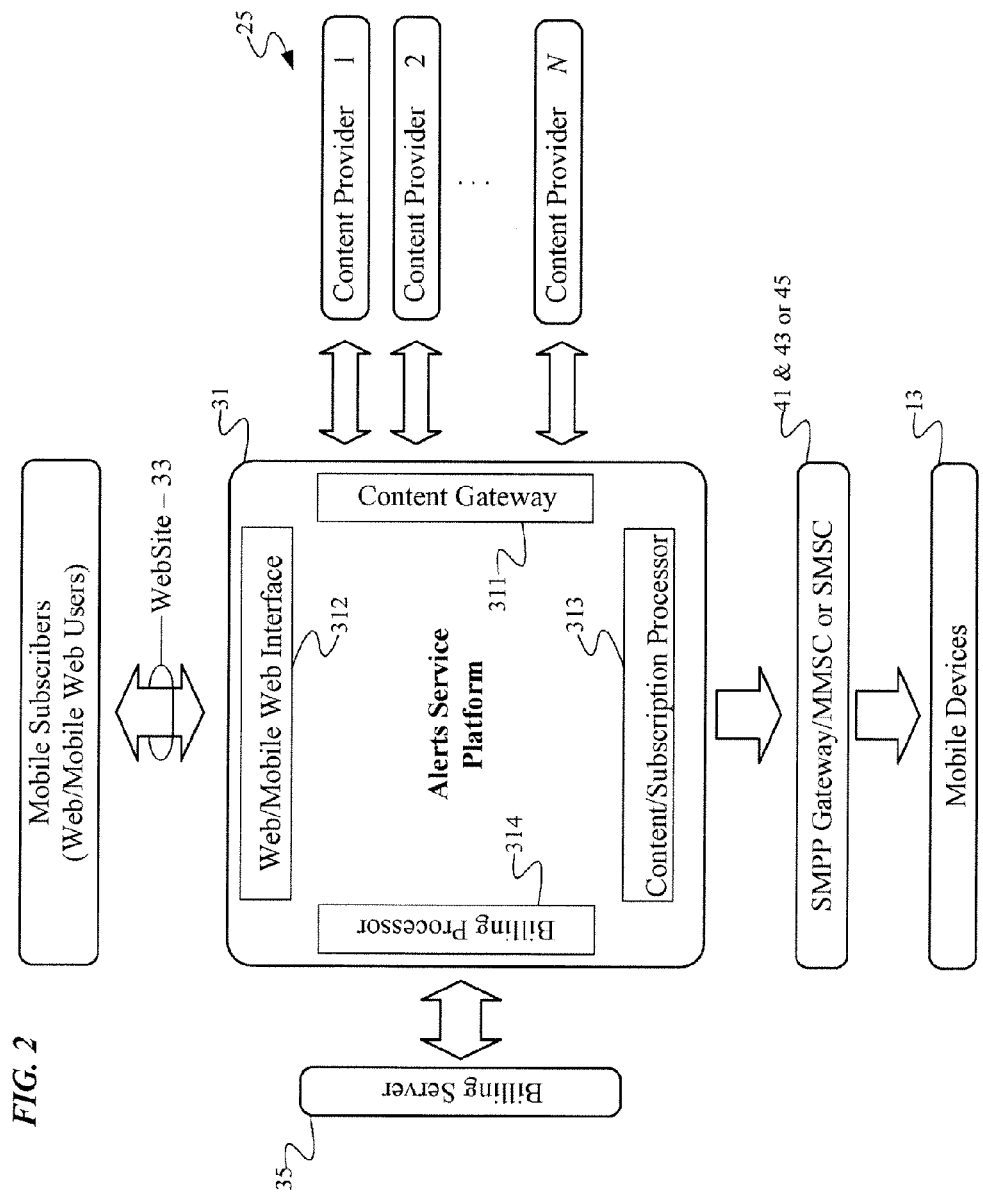
FIG. 2 illustrates a portion of the system of FIG. 1, which is focused on an alerts service platform and other components to interact with the alerts service platform.

FIG. 2 illustrates a portion of the system of FIG. 1, which is focused on the alerts service platform 31 and other components that interact with the alerts service platform 31, which, in combination, provide mobile stations with alerts provided by a number of content providers. The alerts service platform 31 is implemented by one or more server computers running embedded programming instructions to perform the functions of managing subscriptions, subscriber preferences, or profiles for obtaining alerts from content providers and delivering alerts to appropriate users' mobile stations. The alerts service platform 31 may also be implemented, as a functional component, in another component of the carrier network 10.

Referring to FIG. 2, the programmed functional features of the alerts service platform 31 include a content gateway 311, a web/mobile interface 312, a content/subscription processor 313 and a billing processor 314. Although shown on the platform 31, some of these functions may be implemented on or through other elements, such as the website server 33 and the billing server 35.

The alerts service platform 31 receives alerts contents from a number of servers 25 of various content providers, via the content gateway 311. The content gateway 311 communicates with the content providers' servers 25, for example, to collect the alerts contents from the servers 25. Depending on the agreement(s) with the content providers and/or the capability of the different servers, the contents may be provided to the platform 31 in various ways. The contents may be provided as alerts messages to the platform generated in response to trigger events, much as if the platform 31 was a subscriber to all contents subject matter of all of the services offered by the content providers' servers 25. Alternatively, it may be more efficient to deliver contents in time and/or subject matter related batches, at intervals and in formats agreed to between the operator of the platform 31 and the various content service providers.

The alerts service platform 31 provides the user interface 312 to the mobile station users via the website server 33. The user interface offers a web environment for access from a PC or the like as well as a mobile web environment for access from users' mobile stations. The interface 312 allows each mobile station user to subscribe to the alerts service and choose topic, forms and conditions of alerts the user wants to receive via his/her mobile station.

Figure 3:
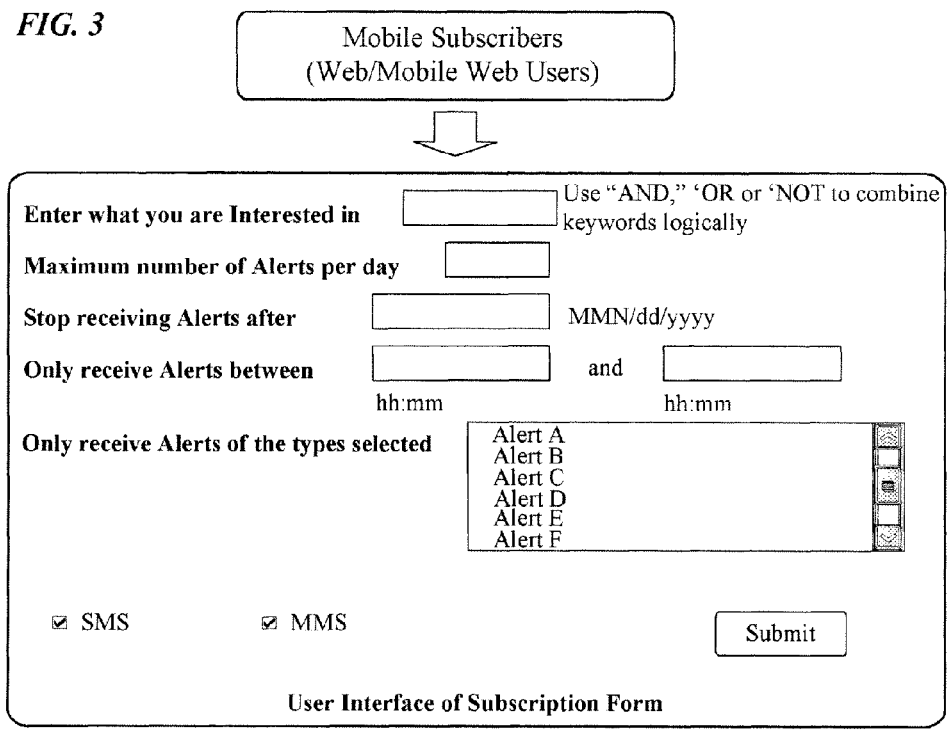
FIG. 3 illustrates an exemplary web based interface via which a mobile station user subscribes to the alerts service.

FIG. 3 illustrates an exemplary page of web based interface 312 via which a mobile station user can subscribe to the alerts service. The interface 312 also allows the user to input information that defines the user's preferences relating to alerts service message content offered by the content providers as well as preferences relating to delivery aspects of the alerts messages. The mobile station user accesses the web based interface 312 offered by the website 33, via landline from a PC or other landline user terminal device or via mobile web environment from the user's mobile station. For example, via this interface, the website server 33 receives user input information defining the user's preferences with regard to alerts service message content available from various content providers' servers 25, e.g. based on the user's various areas of subject matter interest or desire. In the example, the interface offers the mobile station user the ability to input keywords for subjects in which he or she is interested, which are used for logical matching to filter and select contents from the various providers that correspond to the user's interests. The user can input keywords in combination with logical operators such as "AND," "OR," or "NOT," to accurately select alerts contents the user wants to receive.

In the example, the interface 312 also allows the mobile station user to input various conditions relating to when and/or how the alerts messages are to be delivered to the user, such as the number of alerts messages to be sent per day, period for which alerts are to be sent, forms of alerts messages (e.g., SMS or MMS). In addition or as alternatives, the interface 312 may allow the user to specify various priorities and/or combinations of preferences, with regard to content and/or with regard to message delivery functions. For example, the interface may allow the user to specify a combination of priority and delivery time (e.g., personal interest only delivered between 7 pm and 10 pm, business-related can be delivered at any time, if limited in number business takes priority, etc.). Options may also be offered to allow the user to input preferences relating to delivery message number, timing etc. with respect to terminal devices other than or in addition to the user's mobile station.

In our example, the interface 312 also allows the user to choose one or a combination of subscription types, including ordinary category-based subscription and keyword type interest-based subscription. The type of subscription determines the subject matter range of the alert contents to be delivered to the user. An ordinary subscription allows the user to choose only between categories of alerts provided by the content providers. A user who registers with an ordinary subscription to one category, for example receives messages with alerts contents of the same category (type) as that of the user's chosen category. Depending on the service configuration, the user may be allowed to subscribe to some number of categories. An interest-based subscription provides the user with more expansive alerts contents than an ordinary subscription. The interest-based subscription, rather than using the category provided by the user as in an ordinary subscription, asks the user to input keywords related to his or her interest(s); and contents are selected by logical matching or other filtering of the contents received from the contents providers based on the user input keywords. Dependent on the number of inputted categories and keywords, one user can have multiple ordinary subscriptions and multiple interest-based subscriptions.

Preferences with regard to contents and preferences with regard to delivery are stored for use by the unified alerts service platform 31. The alerts service platform 31 receives and stores the preferences received via the user interface and website server 33 in a subscription database 316 (see FIG. 4); and the platform 31 uses the information for processing contents from the providers and for generating and sending messages in accordance with users' preferences. The database 316 may be stored within the computer(s) that operate as the alerts service platform 31 or on a storage device or other computer that is accessible to the alerts service platform 31.

Figure 4:
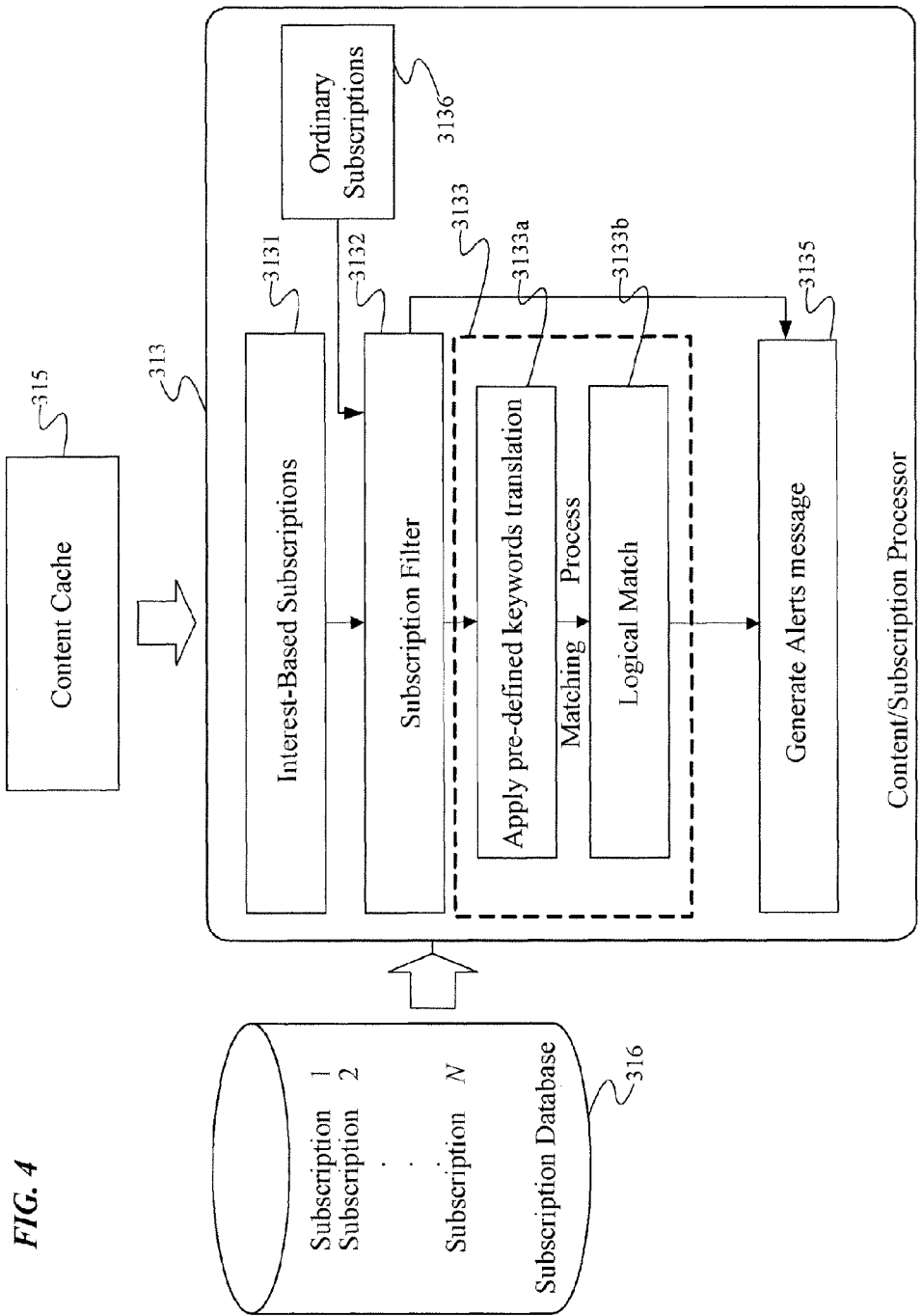
FIG. 4 is a high level block diagram of a content/subscription processor of FIG. 3.

Returning to FIG. 2, the content/subscription processor 313 generates alerts service messages to be sent to each mobile station user based on the preferences defined by the information that the mobile station user input via the interface 312. FIG. 4 is a high level block diagram of the content/subscription processor 313, which also shows an outline of the processing performed by the content/subscription processor 313. The processor 313 has access to one or more storage devices for content cache storage 315 and for storing a subscription database 316. Like the database 316, the cache storage may be on a device within the computer(s) that operate as the alerts service platform 31 or on a storage device or other computer that is accessible to the alerts service platform 31. As outlined earlier, the content gateway receives contents for a wide range of alerts subject matter, periodically or non-periodically, from the multiple content providers' servers 25. The contents may be sent to the content gateway whenever the contents (or a predetermined number of contents) are generated at the content providers. Alternatively or in addition, the content providers' servers 25 may store generated contents and send stored contents to the content gateway periodically independent of the number of contents generated. The received contents are stored, at least temporality, in cache 315, for access and processing by the content/subscription processor 313.

Upon receipt of new contents from the servers 25, the processor 313 retrieves records of each user's subscriptions, which contains the user's chosen content category/type IDs and keywords, as well as any limits on the number of alerts containing alerts contents, message type selection, delivery time preferences or the like, from the subscription database 316. One user may subscribe to either or both of the ordinary subscription and the interest-based subscription.

The content/subscription processor 313 filters the received alert contents dependent on retrieved user's subscriptions. The filtering process depends upon the type(s) of the user's pre-registered subscriptions: an ordinary filtering process used when the user registers an ordinary subscription and an interest-based filtering process used when the user registers an interest-based subscription. The ordinary filtering process filters received alert contents based on one or more content type identifications selected by the particular user. Similarly, the interest-based filtering process features an expansive keyword filtering process. The user can register for either or both the ordinary subscription and the interest-based subscription.

At 3136, the processor 313 retrieves the ordinary subscription(s) information and applies that information to control the subscription filter process at 3132. When so controlled, the subscription filtering performed at 3132 identifies categories of received alert contents and selects alert contents having the same category as that of one of the user's chosen category IDs. For example, if the user chose "Breaking News" and "Sports" from CNN as categories of his or her interest, and selects an ordinary subscription, alert contents having the ID "Breaking News" and alert contents having the ID "Sports" from CNN are selected and thereby remain after the filtering process. For ordinary subscriptions, the process flow jumps upon completion of the filtering at 3132 to the Generate Alerts message step at 3135.

Now, at 3135 after filtering based on one or more ordinary subscriptions, whenever an alert content is selected, the selected alert content is sent to the user's mobile station and a counter of alert contents messages for ordinary subscription (s) for the user is increased. The counter may relate to all messages, or as in this example, the counter may be specific to ordinary subscription messages. When the counter reaches the limit of the number of alerts set by the particular user, filtering for and transmission of the ordinary subscription alert contents for that user are suspended. The counter may be reset after a predetermined time period from the last reset time or based purely on clock time (such as every night at midnight).

At 3131, the processor 313 retrieves the information related to the user's interest-based subscription and applies that information to control the subscription filter process at 3132. When so controlled, the subscription filtering performed at 3132 filters the received alert contents based on the user's chosen keywords that were inputted during the registration process. For interest-based filtering, the subscription filter 3132 uses keywords from the user's interest-based subscriptions from the subscription database 316. Based on the keywords, the processor 313 applies a pre-defined keywords translation process 3133, which finds a set of equivalent keywords to the subscription keywords. The equivalent keywords are keywords used in or assigned to the contents, e.g., on standardized basis agreed upon among the operator of the unified service and the third party content providers. The set of equivalent keywords are pre-defined and stored in the processor 313. The stored equivalent keywords are updated periodically. For example, if the user inputs "Basketball" as a keyword of interest, the pre-defined keywords translation process 3133a expands the keywords of interest to also include "NBA," "scores," "playoffs," and/or "march madness."

In the next step of the matching process 3133, the processor 313 performs a logical matching procedure 3133b by applying the expanded set of keywords to the filtered alerts. The logical matching procedure 3133b logically combines the set of equivalent keywords obtained by the pre-defined keywords translation 3133a. In the above example, the translated keywords "NBA," "scores," "playoffs," "march madness" are combined by logical operators "OR," "AND," or "NOT," e.g. "NBA, scores, and playoffs, not march madness." The logically-combined equivalent keywords are matched with keywords in or associated with the received contents alerts. Non-matching contents are filtered out, and selected contents remain that match one or more of the keywords applied in the filtering step 3133b.

After the logical matching procedure 3133b is performed on the alerts contents, alerts contents in which the user is interested are selected among the alerts contents in cached content 315 received from content providers' server 25. Now, at 3135 after interest-based subscription filtering, whenever an alert content is selected, the selected alert content is sent to the user's mobile station and a counter of alert contents for the user's interest-based subscription or each user is increased. The counter may relate to all messages, or as in this example, the counter may be specific to interest-based subscription messages. When the counter reaches the limit of the number of alerts set by the user, filtering and transmission of the alerts contents are suspended. The counter may be reset as above.

Whether contents are selected by filtering based on ordinary subscription information or selected by interest-based filtering, at least one alerts service message, which contains one or more contents selected for the alerts service delivery to the user, is generated by the processing at 3135. In our example, the alerts service platform may generate and send one or more combined messages each including alerts contents collected from multiple content providers' servers 25. More than one alerts service message may be sent when the selected alerts contents are too numerous or too big for one message or when alerts contents need to be divided according to their categories. Alternatively, a separate message could be sent containing each selected item of content. Each generated message may be text or multimedia for SMS, EMS or MIMS delivery, based on user delivery preference. The generated alerts service message is delivered to the mobile station of the user who subscribes to the alerts service via an SMPP gateway 43, an SMSC 41 or MMSC 45, and the network 15 and the serving base station 17.

Alerts contents not currently satisfying any user's delivery preferences may be kept in cache storage 315 for later processing with regard to other users' preferences.

After delivery of the alerts service message to the mobile station, a billing processor 314 in the alerts service platform 31 generates and sends a record to a billing system 35. The processing in the billing system 35 records usage and accumulates any pre-usage charges for each recipient users' accounts. Depending on the commercial relationship with the content providers' servers 25, the billing system 35 can also record usage/delivery of alerts received from the various content providers' servers 25 and apportion payments to those providers accordingly.

The above described unified alerts service allows the mobile station user to receive alerts with contents obtained from a number of different content providers (each of whom is associated with the alerts service) by subscribing to the alerts service only once. Any additional content providers that are later associated with the alerts service are added so that the mobile station user is able to automatically gain the benefit of alerts service messages from the later content providers, without additional input on the part of the user.

As shown by the above discussion, functions relating to the enhanced alerts delivery service may be implemented on one or more computers connected for data communication via the components of a packet data network, for example, operating as a server 31 and/or 33 connected to a mobile network as shown in FIG. 1. Although special purpose devices may be used, such devices also may be implemented using one or more hardware platforms intended to represent a general class of data processing device commonly used to run "server" programming so as to implement the alerts delivery functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the alerts delivery service. The software code is executable by the general-purpose computer that functions as the alerts service platform server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for delivering alerts service messages to mobile stations, in essentially the manner performed in the implementations discussed and illustrated herein.

Figure 5:
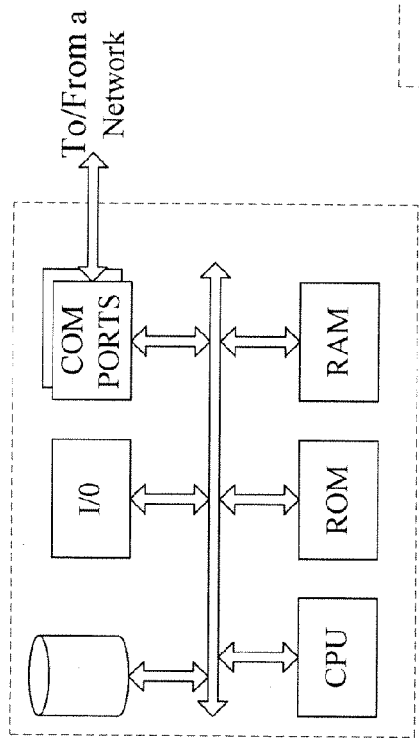
FIG. 5 illustrates a network or host computer platform, as may typically be used to implement a server.
Figure 6:
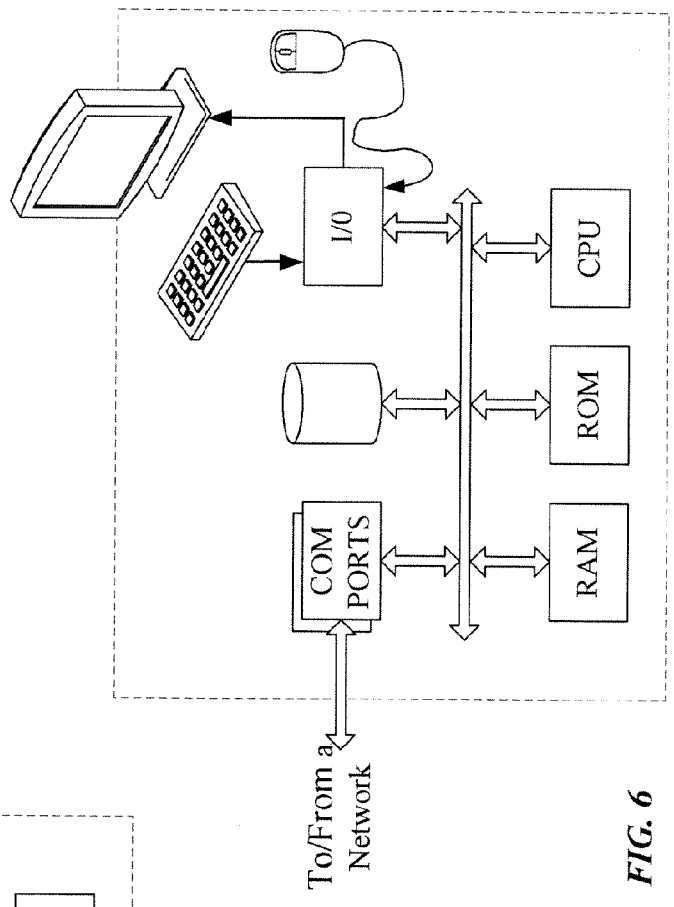
FIG. 6 depicts a computer with user interface elements, as may be used to implement a personal computer or other type of work station or terminal device

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server computer, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of providing an alerts delivery service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the unified alerts delivery service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing unified alerts service messages with alerts contents from content providers, the method comprising steps of:
   receiving and storing user's interest keywords, from a user having a subscription to a unified alerts service platform accessible over a mobile network and offering contents from a plurality of alerts content service providers;
   receiving the alerts contents from the plurality of alerts content service providers;
   expanding the user's interest keywords into a set of equivalent keywords, the set of equivalent keywords including additional keywords related to the user's interest keywords;
   logically matching the set of equivalent keywords with the received alerts contents to identify alerts contents from among the plurality of alerts content service providers which correspond to the set of equivalent keywords; and
   sending, from the unified alerts service platform to a terminal device of the user via the mobile network, one or more mobile messaging service messages, the one or more mobile messaging service messages including the identified alerts contents, without sending the received alerts contents which are not identified.

2. The method of claim 1, wherein the step of receiving the keywords comprises receiving the keywords via a web-based interface or a mobile phone-based interface.

3. The method of claim 2, further comprising receiving, via the web-based interface or the mobile phone-based interface, a limit of number of alerts, a preferred type of message and preferred receipt periods for alerts inputted by the user.

4. The method of claim 3, further comprising:
   suspending transmission of the one or more mobile messaging service messages as a result of a number of the identified alerts contents reaching the limit of number of alerts.

5. The method of claim 3, wherein a type of the one or more mobile message service messages is one of a plurality of forms supported by the mobile network and is selected in accordance with the user's preferred type of message.

6. The method of claim 3, wherein timing of the sending of the one or more mobile messaging service messages is determined based on the user's preferred receipt periods.

7. The method of claim 1, wherein the step of sending comprises sending the one or more mobile messaging service messages through a mobile network to a mobile station of the user.

8. The method of claim 1, wherein:
   the logical matching step comprises:

combining the set of equivalent keywords with logical operators; and determining the identified alerts contents by matching the combined set of equivalent keywords with the received alerts contents.

9. A method for providing unified alerts service messages with alerts contents from content providers, the method comprising steps of:

receiving and storing, at a subscription database, a user's subscription to a unified alerts service platform accessible over a mobile network and offering contents from a plurality of alerts content service providers, the subscription including a first number of ordinary subscriptions and a second number of interest-based subscriptions, the ordinary subscriptions defining user's preferred categories and the interest-based subscriptions defining user's interest keywords;

receiving the alerts contents from the plurality of alerts content service providers;

retrieving the user's subscription from the subscription database;

identifying alerts contents from among the plurality of alerts content service providers dependent on the retrieved user's subscription, by comparing at least one of the ordinary subscriptions or the interest-based subscriptions to the received alerts contents; and sending, from the unified alerts service platform to a terminal device of the user via the mobile network, one or more mobile messaging service messages, the one or more mobile messaging service messages including the identified alerts contents, without sending the received alerts contents which are not identified.

10. The method of claim 9, wherein if the first number of ordinary subscriptions is greater than zero, the identifying alerts contents includes:

identifying category identifiers of the first number of ordinary subscriptions; and matching the identified category identifiers with categories of the received alerts contents.

11. The method of claim 9 wherein if the second number of interest-based subscriptions is greater than zero, the identifying alerts contents includes:

expanding the user's interest keywords into a set of equivalent keywords; and logically matching the set of equivalent keywords with the received alerts contents to identify the alerts contents from among the plurality of alerts content service providers.

12. The method of claim 9, further comprising:

receiving a limit of number of alerts for each of the ordinary subscriptions and the interest-based subscriptions, and a limit of number of alerts for the user.

13. The method of claim 12, further comprising:

suspending transmission of the one or more mobile messaging service messages including the identified alerts contents as a result of a number of the identified alerts contents reaching:

the limit of number of alerts for each of the ordinary subscriptions and the interest-based subscriptions, or the limit of number of alerts for the user.

14. A computer system configured as a unified alerts service platform, comprising:

an interface for interactive communication with a terminal device for receiving user's interest keywords, from a user having a subscription to the unified alerts service platform offering contents from a plurality of alerts content service providers;

a content gateway for receiving alerts contents from systems of the plurality of alerts content service providers; and a content processor configured to:

(a) perform a logical matching for finding, from the received alerts contents, alerts contents that logically match the user's interest keywords to identify alerts contents from among the plurality of the alerts content service providers satisfying user's preferences; and (b) send one or more mobile messaging service messages, including the identified alerts contents satisfying the user's preferences, as at least one alert, to a mobile station of the user via a mobile network, without sending the received alerts contents which are not identified.

15. The system of claim 14, further comprising at least one storage for storing a subscription database including:

predefined keywords equivalent to a number of the user's interest keywords defining one or more interest-based subscriptions for the user, and ordinary subscriptions defining the user's preferred categories of interest-based subscriptions.

16. A computer system configured as a unified alerts service platform, comprising:

an interface for interactive communication with a terminal device for receiving input from a user regarding a subscription to the unified alerts service platform offering contents from a plurality of alerts content service providers;

a database storing a subscription for the user, the subscription including a first number of ordinary subscriptions and a second number of interest-based subscriptions, the ordinary subscriptions defining user's preferred categories and the interest-based subscriptions defining user's interest keywords;

a content gateway for receiving alerts contents from systems of the plurality of alerts content service providers; and a content processor configured to:

(a) receive the alerts contents from the plurality of alerts content service providers;

(b) retrieve the user's subscription from the database;

(c) identify alerts contents from among the plurality of alerts content service providers dependent on the retrieved user's subscription, by comparing at least one of the ordinary subscriptions or the interest-based subscriptions to the received alerts contents; and (d) send, to a terminal device of the user via a network, one or more mobile messaging service messages, the one or more mobile messaging service messages including the identified alerts contents, without sending the received alerts contents which are not identified.

* * * * *